United States Patent [19]

Karkoski et al.

[11] 4,075,179

[45] Feb. 21, 1978

[54] POLYESTERIMIDES AND PROCESSES FOR PREPARING SAME

[75] Inventors: Joseph Karkoski; Charles William McGregor; Lionel Joseph Payette, all of Fort Wayne, Ind.

[73] Assignee: Essex International, Inc., Fort Wayne, Ind.

[21] Appl. No.: 644,374

[22] Filed: Dec. 24, 1975

[51] Int. Cl.² ............................................. C08G 63/68
[52] U.S. Cl. ............................ 260/75 N; 260/47 CZ; 428/375
[58] Field of Search ..................... 260/75 N, 47 CZ

[56] References Cited

U.S. PATENT DOCUMENTS

| | | | |
|---|---|---|---|
| 3,274,159 | 9/1966 | Kluiber | 260/75 N |
| 3,459,829 | 8/1969 | Schmidt et al. | 260/75 N X |
| 3,922,252 | 11/1975 | Holub et al. | 260/75 N |
| 3,929,714 | 12/1975 | Schmidt et al. | 260/75 N X |

*Primary Examiner*—Lucille M. Phynes
*Attorney, Agent, or Firm*—Steven F. Stone

[57] ABSTRACT

Polyesterimide polymers are provided as well as processes for preparing the same. Polyesterimide compositions are provided which can be applied as a magnet wire coating with the resulting magnet wire exhibiting excellent flexibility, heat shock, dielectric, and thermal properties. Such polyesterimide compositions can function as hot melt coating compositions for application as a magnet wire coating in a solventless process.

13 Claims, No Drawings

POLYESTERIMIDES AND PROCESSES FOR PREPARING SAME

BACKGROUND OF THE INVENTION

This invention relates to polyesterimide polymers, processes for preparing the same and articles containing the same. More particularly, this invention is directed to polyesterimide compositions and processes for preparing the same, and to such compositions which can be applied either in a solvent or solventless process as a magnet wire coating with the resulting magnet wire exhibiting excellent flexibility, heat shock, dielectric, and thermal properties.

In the manufacture of magnet wire, that is, an electrical conductor with an insulating enamel coating which should possess desirable properties such as electrical insulating properties, resistance to heat and solvent attacks and the like, the insulating enamel is normally applied with conventional equipment in a solvent based system in which the enamel is dissolved therein for ease of application to the wire. Such solvent based enameling systems have many and various disadvantages among which are included the cost of the solvent, manufacturing pollution caused by the solvent and the like. Most enamels of the polyestermimide types, however, are synthesized in a solvent in order to achieve sufficient molecular weight which allows the final synthesized polymer to be used directly in the solvent based enameling system with further dilution, if necessary.

As can be appreciated therefore, a polyesterimide composition which can be prepared without the use of solvents and used in a hot melt condition in conventional equipment and with conventional techniques as a magnet wire coating would represent an advancement in or a contribution to this art. Such would be particularly advantageous of the resulting magnet wire exhibits excellent flexibility, heat shock, dielectric, and thermal properties. Equally advantageous would be a polyesterimide composition which would be applied either in a hot melt condition or in a solvent based system in order to permit processing flexibility.

SUMMARY OF THE INVENTION

The present invention contemplates a polyesterimide composition which can be applied either with or without the necessity for solvents as a magnet wire coating with resulting magnet wire exhibiting excellent flexibility, heat shock, dielectric, and thermal properties.

In accordance with one aspect of the invention a polyesterimide polymer is provided which can be characterized by its acidimide component and its ester component as well as its tricarboxylic cross-link material, all of which will be more fully discussed hereinafter.

In accordance with another aspect of the invention a process for preparing the polyesterimide polymer of the present invention is provided, all of which will be more fully discussed hereinafter.

In accordance with another aspect of the invention a magnet wire is provided which contains as its insulation coating thereon a polyesterimide coating composition having during application a low cross-linked density to enable the composition to be applied at low melt temperatures and after application a higher degree of cross-linked density and polymerization in order for the composition to exhibit the necessary wire insulation properties, all of which will be more fully discussed hereinafter.

DESCRIPTION OF TYPICAL OR PREFERRED EMBODIMENTS

What is set forth herein is intended primarily as exemplary to enable those skilled in the art to practice the present invention and it should therefore be understood that, within the scope of the appended claims and their permissible equivalents, the invention may be practiced in other ways than as specifically described.

In general, polyesterimides are polymers that contain both imide and ester bonds or linkages. In general, the polyesterimide of the present invention contains imide bonds which are introduced into the polymer by the reaction of a tricarboxylic material and an aromatic diamine material which forms an acid-imide component. The ester bonds are intoduced into the polymer by the reaction of hydroxyl containing materials and carboxyl containing materials as well as their reaction with the acid-imide component. The formed polyesterimide polymer also contains a tricarboxylic cross-linking material introduced into the polymer for composition and application advantages.

In general, therefore, the polyesterimides of the present invention can be characterized as comprising the combination of:
an acid-imide component comprised of:
  a tricarboxylic material unit represented by the following formula:

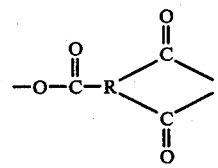

wherein: R is an organic trivalent radical; and an aromatic diamine material unit represented by the following formula:

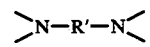

wherein: R' is an aromatic divalent radical;
an ester component comprised of:
  a hydroxyl containing material unit represented by the following formula:

$$- O - R'' - O$$

wherein: R'' is an aliphatic divalent radical, and a carboxyl containing material unit represented by the following formula:

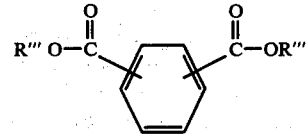

wherein: R''' is selected from the group consisting of hydrogen and lower alkyl groups; and
a tricarboxylic cross-link material component.

In general, the polyesterimides of the present invention can be further characterized by its ester component to acid-imide component (ester to imide) equivalent ratio, its hydroxyl containing material to carboxylic material (hydroxyl to carboxyl) equivalent ratio, and its tricarboxylic material and carboxyl material to tricarboxylic cross-link material (acid to cross-link) equivalent ratio, all of which will be more fully discussed hereinafter.

The term "equivalent" as used herein refers to the number of moles of a substance multiplied by the number of functional groups i.e., carboxyl group (—COOH), ester group (—COOR where R in an alkyl), or hydroxyl group (—OH), present in its structure. For example, the number of equivalents of ethylene glycol is the number of moles of ethylene glycol present times two. The term "equivalent percent" as used herein refers to the number of equivalents of a particular reactant divided by the total number of equivalents of all reactants times 100. The compositions employed in the present invention are descried in terms of equivalents instead of in terms of moles, since the ingredients which make up the polyesterimide polymer react equivalent for equivalent rather than mole for mole.

As can be appreciated, for a resin to be applied to wire at 100% solids via hot melt technique it should meet certain requirements. For example, it should initially be a material which can melt and flow in order for it to be applied to the wire. Once applied to the wire it should be capable of being cured to an insulating material that provides all of the necessary or desired thermal, physical, chemical and electrical properties of a magnet wire insulator. It has been found that a polyesterimide material can be prepared with an initial relatively low cross-link density and thereafter under applicable conditions the cross-link density and polymerization can be increased in order for the polymer to have the necessary or desired insulating properties.

The polyesterimides can be prepared by forming a reaction mixture of the reactants in the proportions desired for the final polymer. This reaction mixture is heated at an elevated temperature, above about 100° C and preferably from about 120° – 130° C, for a sufficient time to form an acid-imide component, normally observed by a crust stage forming, and thereafter the temperature slowly raised to greater than about 180° C and preferably about 200° C to about 230° C until a resin mix-off viscosity at 40% solids in cresylic acid is in the range of S - Z1 (Gardner-Holdt). The resin is then allowed to cool and solidify.

Generally speaking, the reactants can be reacted in a suitable solvent such as cresylic acid, cresylic acid-phenol mixtures, and the like with or without the addition of high boiling hydrocarbon solvents.

It has been found desirable to add to the polyesterimide base about 0.05% to 3%, based on the weight of the solids, of an organic titanate such as tetrabutyl titanate as a catalyst. Among the organic esters of titanium which have been found useful in connection with the invention are those corresponding to the general formula Ti(OR)$_4$ where R is a radical selected from the group consisting of the saturated and unsaturated aliphatic hydrocarbon radicals, as is well known in this art.

The tricarboxylic material can be characterized by the following formula:

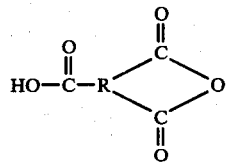

wherein: R is a trivalent organic radical.

While trimellitic anhydride is preferred as the tricarboxylic material, any of a number of suitable tricarboxylic constituents will occur to those skilled in the art including 2,6,7-napthalene tricarboxylic anhydride; 3,3'4-diphenyl tricarboxylic anhydride; 3,3',4-benzophenone tricarboxylic anhydride; 1,3,4-cyclopentane tricarboxylic anhydride; 2,2'3-diphenyl tricarboxylic anhydride; diphenyl sulfone-3,3',4-tricarboxylic anhydride; diphenyl isopropylidene-3,3'4-tricarboxylic anhydride; 3,4,10-preylene tricarboxylic anhydride; 3,4-dicarboxyphenyl 3-carboxyphenyl ether anhydride; ethylene tricarboxylic anhydride; 1,2,5-napthalene tricarboxylic anhydride; 1,2,4-butane tricarboxylic anhydride; and mixtures of the foregoing and the like.

The aromatic diamine material can be characterized by the following formula:

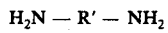

wherein: R' is an aromatic divalent radical.

While methylene dianiline is preferred as the aromatic diamine, any of a number of suitable aromatic diamine constituents will occur to those skilled in the art including 4,4'-diamino-2,2' sulfone diphenylmethane; meta-phenylene diamine; para-phenylene diamine; 4,4'-diamino-diphenyl propane; 4,4'-diamino-diphenyl methane benzidine; 2,6-diamino-pyridine; 2,4'-oxydianiline; 4,4'-diaminobenzophenone; bis(4-amino-phenyl)-N-methylamine; 3,3'-dimethyl-4,4'-diamino-biphenyl; toluene diamine; m-xylylene diamine; p-xylylene diamine; polymethylene polyamine (Curithane) and mixtures of the foregoing and the like.

The hydroxyl containing material can be characterized by the following formula:

wherein: R" is an aliphatic divalent radical, preferably an alkane radical.

While ethylene glycol is preferred as the hydroxyl containing compound, any of a number of suitable diol or glycol constituents will occur to those skilled in the art including propanediols, bitanediols, pentanediols, hexanediols, octanediols, and mixtures of the foregoing and the like.

The carboxyl containing material can be characterized by the following formula:

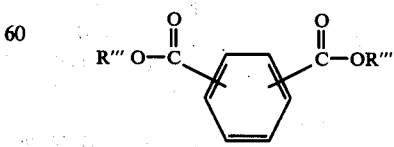

wherein: R''' is selected from the group consisting of hydrogen and lower alkyl groups, such as methyl, ethyl, n-propyl, iso-propyl and the like.

While dimethyl terephthalate ester is preferred as the carboxyl containing material, any of a number of suitable carboxyl constituents will occur to those skilled in the art including terephthalic acid, isophthalic acid, and the lower alkyl esters of each, such as the diethyl esters, dipropyl esters, dibutyl esters, and mixtures of the foregoing and the like.

The tricarboxylic cross-link material can be characterized by the tricarboxylic acids of the following formula and the corresponding anhydrides thereof:

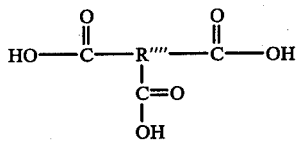

wherein: R'''' is a trivalent organic radical.

While trimellitic anhydride, trimellitic acid and trimesic acid are preferred as the tricarboxylic cross-link material, any of a number of suitable tricarboxylic cross-link materials will occur to those skilled in the art including those materials characterized by the same formula as used for the tricarboxylic material and described in relation thereto. Additionally, in conjunction with such materials can be used other cross-link materials including glycols, such as glycerol, tris (2-hydroxyethyl) isocyanurate, trimethyl propane and pentaerythritol; and amines, such as polymethylene, polyphenyl amines.

Certain factors were found influential in achieving the polyesterimides and such include its ester to imide equivalent ratio, its hydroxyl to carboxyl equivalent ratio and its acid to cross-link equivalent ratio.

As previously described, the imide bond is introduced into the polymer by forming a acid-imide component. This component reacts chemically with hydroxyl groups like a diacid to form ester bonds. It has been found that the imide content of the polymer should be less than the ester content of the polymer in order to gain the increased thermal stability of the imide content but retaining the necessary processability of the ester content. The ester to imide equivalent ratio should, therefore, preferably be greater than about 2:1 and especially preferred from about 2.5:1 to about 3.5:1.

The hydroxyl to carboxyl equivalent ratio should typically be such as to provide for the reaction to initially terminate the relatively low molecular weight resin. It is preferred that a ratio greater than about 1.5:1 be used and especially preferred is a ratio range of from about 1.7:1 to about 1.9:1.

The tricarboxylic cross-link material is important since the initial resin should have a cross-link density to enable it to be melted at a relatively low temperature but capable of being cured by increasing the degree of polymerization and cross-linking density in order for the polymer to achieve the necessary or desired insulating properties. The acid to cross-link equivalent ratio should preferably be above about 1.5:1 and especially preferred from about 2:1 to about 3:1.

The magnet wire conductor, typically copper or aluminum and round, can have a coat of insulating material of the polyesterimide coating as the base coat. In the application of the coating, the composition can be applied in any conventional manner, such as the use of dies in a wire coating tower with normal bank temperatures. The coating can be applied in various thicknesses depending upon, inter alia, the particular composition used, the type and size of wire and the physical properties desired which are governed by industry standards. The resulting magnet wire can be wound, spooled or handled in accordance with conventional magnet wire techniques.

In order to illustrate the present invention, the following examples are presented with parts and percentages being by weight unless otherwise specified.

EXAMPLE 1

The following reactants were used in the stated equivalent percent:

| Reactant | Equivalent Percent |
|---|---|
| Ethylene glycol | 52.2 |
| Dimethyl terephthalate | 8.6 |
| Methylene dianiline | 9.6 |
| Trimellitic anhydride | 29.6 |

The equivalent ratios of the following groups were as follows:

| | |
|---|---|
| Ester : Imide | 3.0 : 1.0 |
| Hydroxyl : Carboxyl | 1.8 : 1.0 |
| Difunctional acid : Trifunctional* Material | 2.7 : 1.0 |

*Trifunctional cross-link material used was excess trimellitic anhydride.

The rectants were charged in a reaction flask equipped with a stirrer, a thermometer, an inert gas inlet and a packed column. The packed column was fitted with a Dean-Stark distillate trap and a water-cooled condenser. A tetra butyl titantate (TBT) catalyst was used at a level of 0.1% of the reactants' weight. Xylene was used as an axeotropic agent to help remove the reactant by-products of water and methanol.

The reactants were heated and mixed under an inert gas atmosphere. After about an hour, the reaction temperature had reached 90° C and the water distillate was being azeotropically removed. At this stage, the diacid-diimide formation was occurring and the mixture turned yellow in color and a very viscous crust stage formed. The mixture was heated over a 2½ hour period to a temperature of 155° C when the crust stage turned to a molten yellow liquid. After the crust stage had broken, the temperature was taken up to 180° C in a half hour and both water and methanol distillates were being collected. The temperature was then slowly raised 10° – 20° per hour until a temperature of 220° C had been attained. When the temperature had reached 200° C and about 93% of the expected distillate had been collected, the resin turned from an opaque yellow to clear amber in color. At this point, the percent carboxyl content (%COOH) was about 0.5 and the resin viscosity at 40% solids in cresylic acid solvent (Koppers 830-A) was a Gardner-Holdt value of S1/2-T1/2. The reaction was allowed to proceed until the desired viscosity was obtained.

The reaction was terminated by cooling the resin below 180° C, and pouring the resin into an appropriate container and allowing it to solidify. The COOH percent of the final resin was less than 0.25, indicating essentially complete reaction of the acid groups. The resin was clear amber in color.

The resin was applied to 18 AWG copper wire as a hot melt resin to evaluate both the resin and the application technique. After being applied as a hot melt to the wire in the conventional manner, the resin cured by passing the wire through a standard 20 ft. magnet wire curing oven. During this cure cycle, the heat converts the low cross-linked density resin to a higher cross-linked density polymer by transesterification and removal of the excess glycol. The following Table II sets forth typical test results for the polymer of Example 1 and other polymers of the present invention, listed as Examples 2-10, using the listed reactants in the following Table I and applied on 18 AWG copper wire in the same manner as Example 1:

TABLE I

| Example | 1 | 2 | 3 | 4 | 5 | 6 | 7 | 8 | 9 | 10 |
|---|---|---|---|---|---|---|---|---|---|---|
| Ethylene glycol | 224 | 218 | 205 | 248 | 284 | 284 | 333 | 284 | 305 | 284 |
| Dimethyl terephthalate | 114 | | | 147 | 147 | 84 | | 147 | 170 | 128 |
| Isophthalic acid | | 93 | 85 | | | | 26 | | | |
| Terephthalic acid | | | | | | | 120 | | | |
| Methylene dianiline | 130 | 52 | | 166 | 166 | 141 | 195 | | 88 | 111 |
| Meta phenyline diamine | | 42 | 70 | | | | | 91 | 58 | |
| Diamino toulene | | | | | | 44 | | | | 34 |
| Trimellitic anhydride | 344 | 345 | 345 | 440 | 490 | 538 | 511 | 440 | 511 | 451 |
| Equivalent ratios | | | | | | | | | | |
| Ester : Imide | | 3.0:1 | 3.0:1 | 3.0:1 | 3.5:1 | 2.4:1 | 3.0:1 | 3.0:1 | 3.0:1 | 3.0:1 |
| Hydroxyl : Carboxyl | | 1.8:1 | 1.7:1 | 1.6:1 | 1.6:1 | 1.8:1 | 1.8:1 | 1.8:1 | 1.7:1 | 1.8:1 |
| Difunctional acid : Trifunctional material* | | 2.5:1 | 2.5:1 | 217:1 | 1.9:1 | 2.5:1 | 2.7:1 | 2.7:1 | 2.5:1 | 2.3:1 |

*Trifunctional cross-link material used was excess trimellitic anhydride

TABLE II

| EXAMPLE | 1 | 2 | 3 | 4 | 5 | 6 | 7 | 8 | 9 | 10 |
|---|---|---|---|---|---|---|---|---|---|---|
| Wire Speed, ft./min. | 45 | 45 | 45 | 42 | 42 | 42 | 48 | 42 | 42 | 45 |
| Build, mils. | 3.2 | 3.1 | 3.1 | 3.2 | 3.2 | 3.1 | 3.1 | 3.1 | 3.2 | 3.1 |
| Appearance | G | G | G | G | G | F | G | G | G | F |
| Flexibility Snap + Mandrel | 1X | 1X | 1X | 2X | 3X | 2X | 1X | 1X | 1X | 1X |
| Unilateral Scrape, grams | 1830 | 1370 | 1560 | 1650 | 1550 | 1700 | 1600 | 1750 | 1460 | 1700 |
| Dielectric, kilovolts | 13.8 | 11.0 | 10.9 | 14.0 | 14.6 | 15.4 | 12.9 | 13.0 | 13.9 | 13.1 |
| Thermoplastic Flow, ° C | 290 | 285 | 305 | 280 | 305 | 300 | 295 | 310 | 300 | 300 |
| Heat Shock 20% + 3X, ° C | 200 | 200 | 180 | 250 | 200 | 250 | 200 | 200 | 200 | 250 |

Note:
G = Good
F = Fair
Test methods used are those approved and described by ASTM in Bulletin D-1676

From the foregoing, it can be appreciated that the polyesterimide compositions and the magnet wire containing such coating compositions thereon have many and various advantages. The bonding compositions can either be applied to the wire in a hot melt condition or in a solvent system by using conventional equipment and techniques. This permits important processing flexibility. Additionally, such magnet wire exhibits excellent properties, such as, flexibility (snap + 1X over a wide cure range), heat shock (at least 200° C at 20% elongation and 3X), high dielectric (3 kilovolts/mil), and class F (155° C) thermal rating.

Having thus described typical or preferred embodiments of the invention, we claim:

1. A solvent free hot melt polyesterimide polymer coating composition comprising the combination of:
an acid-imide component comprised of:
   a tricarboxylic material unit represented by the following formula:

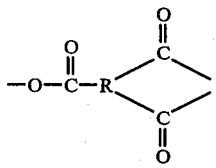

wherein: R is an organic trivalent radical, and an aromatic diamine material unit represented by the following formula:

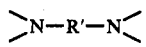

wherein: R' is an aromatic divalent radical;
an ester component comprised of:
   a hydroxyl containing material unit represented by the following formula:

O—R"—O wherein: R" is an aliphatic divalent radical, and a carboxyl containing material unit represented by the following formula:

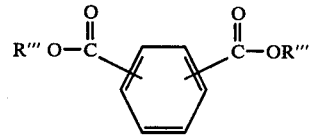

wherein: R''' is selected from the group consisting of hydrogen and lower alkyl groups; and
a tricarboxylic cross-link material component; said composition having an ester to imide equivalent ratio greater than about 2:1, an hydroxyl to carboxyl equivalent ratio greater than about 1.5:1, and an acid to cross-link equivalent ratio greater than about 1.5:1.

2. A polyesterimide polymer composition according to claim 1, wherein said tricarboxylic cross-link material is selected from the group consisting of said tricarboxylic material and the corresponding acids of such material.

3. A polyesterimide polymer composition according to claim 2, wherein said ester to imide equivalent ratio is from about 2.5:1 to about 3.5:1, said hydroxyl to carboxyl equivalent ratio is from about 1.7:1 to about 1.9:1, and said acid to cross-link equivalent ratio is from about 2:1 to about 3:1.

4. A polyesterimide polymer composition according to claim 3, wherein said tricarboxylic material unit is trimellitic anhydride, said aromatic diamine is methylene dianiline, said hydroxyl containing material is ethylene glycol, said carboxyl containing material is dimethyl terephthalate and said tricarboxylic cross-link material is selected from the group consisting of trimellitic anhydride and its corresponding acid.

5. A process for preparing a hot melt polyesterimide polymer coating composition from the following materials in the absence of any additional solvent:

a. a tricarboxylic material having the formula

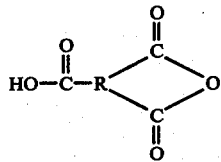

wherein R is a trivalent organic radical;

b. an aromatic diamine having the formula

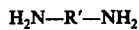

wherein R' is an aromatic divalent radical;

c. a dihydroxy material having the formula

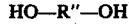

wherein R" is an aliphatic divalent radical;

d. a dicarboxylic material having the formula

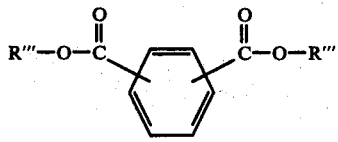

wherein R'" is selected from the group consisting of hydrogen and lower alkyl groups; and e. a tricarboxylic cross link material selected from the group consisting of tricarboxylic acids having the formula

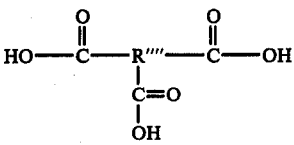

wherein R"" is a trivalent organic radical and anhydride thereof;

said materials being employed in amounts to produce, in the finished product, an ester to imide equivalent ratio greater then about 2:1, an hydroxyl to carboxyl equivalent ratio greater than about 1.5:1 and an acid to cross-link equivalent ratio greater than about 1.5:1; which comprises performing the following steps in the absence of any additional solvents:

a. forming a diacid-diimide component at a temperature greater than about 100° C and lower than the temperature at which the diacid-diimide will react with the hydroxyl containing material to form an ester; and b. after at least a portion of said diacid-diimide has been formed, increasing the temperature of the reaction mixture to greater than about 180° and continuing the reaction until the hot melt reaction product has a resin mix-off viscosity at 40% solids in cresylic acid within the range of S to Z1 on the Gardner-Holt scale.

6. The process according to claim 5 wherein said tricarboxylic cross link material is selected from the group consisting of said tricarboxylic material and the corresponding acids of such material.

7. The process according to claim 6 wherein said tricarboxylic material unit is trimellitic anhydride, said aromatic diamine is methylene dianiline, said hydroxyl containing material is ethylene glycol, said carboxyl containing material is dimethyl terephthalate, and said tricarboxylic cross link material is selected from the group consisting of trimellitic anhydride and its corresponding acid.

8. A hot melt coating composition prepared according to the process of claim 5.

9. A hot melt coating composition prepared according to the process of claim 6.

10. A hot melt coating composition prepared according to the process of claim 7.

11. A process according to claim 5, wherein said ester to imide equivalent ratio is from about 2.5:1 to about 3.5:1, said hydroxyl to carboxyl equivalent ratio is from about 1.7:1 to about 1.9:1, and said acid to cross-link equivalent ratio is from about 2:1 to about 3:1.

12. The process of claim 5 wherein said process is conducted as a single batch process.

13. The process of claim 5 wherein said diacid-diimide formation is carried to substantial completion prior to esterification.

* * * * *